US006772151B1

(12) United States Patent
Johnston et al.

(10) Patent No.: US 6,772,151 B1
(45) Date of Patent: Aug. 3, 2004

(54) COLOR MATCHING SYSTEM AND METHOD

(75) Inventors: Richard C. Johnston, Oakwood, GA (US); Susan Bates, Tacula, GA (US); Scott Russell, Suwanee, GA (US); Michael E. Masterson, Tacula, GA (US); Kenneth E. Jacobson, Alpharetta, GA (US); Alan R. Burgess, Roswell, GA (US); David L. Sapp, Duluth, GA (US)

(73) Assignee: Polyone Corporation, Avon Lake, OH (US)

( * ) Notice: Subject to any disclaimer, the term of this patent is extended or adjusted under 35 U.S.C. 154(b) by 110 days.

(21) Appl. No.: 09/595,111

(22) Filed: Jun. 16, 2000

(51) Int. Cl.[7] .............................................. G06F 17/30
(52) U.S. Cl. ..................... 707/6; 707/3; 707/4; 430/11; 428/407; 428/427
(58) Field of Search ............................ 707/1–10, 100, 707/104; 345/600, 604, 589, 591, 593; 382/191, 209, 305; 358/518, 523, 524, 522; 430/11; 359/3, 7; 428/407, 327

(56) References Cited

U.S. PATENT DOCUMENTS

| | | | |
|---|---|---|---|
| 4,654,794 A | 3/1987 | O'Brien | |
| 4,684,488 A | 8/1987 | Rudolph | |
| 4,813,000 A | 3/1989 | Wyman et al. | |
| 4,887,906 A | 12/1989 | Koehler | |
| 5,002,812 A | * 3/1991 | Umehara et al. | 428/64 |
| 5,428,720 A | * 6/1995 | Adams, Jr. | 345/604 |
| H001506 H | * 12/1995 | Beretta | 345/591 |
| 5,502,799 A | 3/1996 | Tsuji et al. | |
| 5,668,633 A | * 9/1997 | Cheetam et al. | 356/402 |
| 5,675,407 A | 10/1997 | Geng | |
| 5,798,943 A | 8/1998 | Cook et al. | 364/526 |
| 5,841,421 A | 11/1998 | Cheetam et al. | |
| 5,893,095 A | * 4/1999 | Jain et al. | 707/6 |
| 5,929,998 A | 7/1999 | Kettler et al. | 356/405 |
| 5,930,769 A | 7/1999 | Rose | 705/27 |
| 5,949,904 A | 9/1999 | Delp | 382/165 |
| 5,963,334 A | 10/1999 | Yamaguchi et al. | |
| 5,978,804 A | * 11/1999 | Dietzman | 707/10 |
| 6,026,411 A | * 2/2000 | Delp | 707/104 |
| 6,226,412 B1 | * 5/2001 | Schwab | 382/305 |
| 6,330,341 B1 | * 12/2001 | Macfarlane et al. | 382/100 |
| 6,342,952 B1 | * 1/2002 | Chan | 345/593 |
| 6,349,300 B1 | * 2/2002 | Graf et al. | 707/100 |
| 6,411,953 B1 | * 6/2002 | Ganapathy et al. | 707/6 |

FOREIGN PATENT DOCUMENTS

| | | |
|---|---|---|
| EP | 0 484 564 A1 | 5/1992 |
| EP | 0 767 362 A1 | 4/1997 |
| WO | WO 97/29441 | 9/1997 |

OTHER PUBLICATIONS

"ColorTools™ QC Color Quality Control Software", Datacolor International.

(List continued on next page.)

Primary Examiner—Jean M. Corrielus
Assistant Examiner—Anh Ly
(74) Attorney, Agent, or Firm—John H. Hornickel (57) ABSTRACT

A system and a method are provided for matching the color of a target sample at a remote location. The system has a first computer that is operative to receive and transmit target spectral data at a first location. A second computer in the system is located at a second location remote from the first computer. The second computer is operative to receive the target spectral data or formula identifier from the first computer. The system includes a database including a plurality of data sets. Each data set has at least spectral data corresponding to standard samples. The system also has software capable of searching the database using the target spectral data as search criteria and returning a match with a data set having standard spectral data that matches the target spectral data. The system optionally has a device that can sense the target spectral data of the target sample and input that target spectral data into the first computer, optionally also non-spectral data and QC capability.

20 Claims, 4 Drawing Sheets

OTHER PUBLICATIONS

Colorite™, "The Fast Track From Mind To Market", Datacolor International.
"Color & Colorimetry", Datacolor International, Alain Chrisment (1998).
Website—Datacolor International (2000) (28 pgs.).
Website—GE ColorXpress (2000) (4 pgs.).
Website—X-Rite® (2000) (17 pgs.).
Ciba Specialty Chemicals Web Page: "A New Vision in Color Matching"; www.cibasc.com (2003).
"Automated Color Management at Fortsmann & Co." *Textile World*; (1993).
"Remote Color Control Systems" *ACS 2800/2500 Remotes* Applied Color Systems (1987).
"ACS Chroma–Calc Color Control Software for Paint & Coatings Manufacturers" Applied Color Systems (1987).
"ACS Chroma–Calc Color Control Software for Ink Manufacturers and Printers" Applied Color Systems (1989).
"Satellite color control systems 2026" Datacolor International (Before 1996).
"The VCS–11 Visual Color Simulation System" Applied Color Systems (1988).
"Chroma–Calc Color Control Software For the Plastics Industry" ACS Datacolor (Before 1996).
"Fast and accurate ink blending system ensures consistent colour matching" *International Paper Board Industry* (1992).
"Multi–User Color Control System with Chroma–Calc Software Package—ACS 3300" Applied Color Systems (1986).
"Introducing Chroma–Link, The ACS Color Management Network" Applied Color Systems (1987).

* cited by examiner

COLOR MATCHING SYSTEM AND METHOD

FIELD OF THE INVENTION

The present invention relates to a system and process for matching, ordering, producing, and quality controlling the color of a target sample of polymer product, communicating the formulation or material reference, producing a sample or production quantity and supplying the sample or product to a processor.

BACKGROUND

In the past, methods used to match color in the polymers industry were subjective and relied on much trial and error. A colorant supplier would have to guess as to which colorant compound or concentrate, out of thousands of previously produced such products, might produce the nearest color match to a target sample, or alternatively, the supplier would create a new colorant product. Based on that guess or new product, a sample was mailed for onsite visual inspection, comparison and evaluation by the customer. If the sample was sufficiently close in color based on subjective evaluation criteria, and therefore a desirable match, the method may end there. Otherwise, the method was repeated either until an appropriate sample was discovered among the multitude of previously produced products, or until modifications were made to an existing or the new formulation that resulted in a sufficient sample match. This unpredictable method resulted in delays that significantly lengthened the time-to-market for a colorant and its final polymer product.

Recent methods of matching colors in the polymer industry allow a colorant supplier to use a spectrophotometer to scan a target sample and generate a spectrum that is specific to that target sample. The generated target spectrum is unique to that sample and acts as a "color fingerprint." The color fingerprint can be used as a more objective standard than the subjective standard produced by visual inspection or guesswork. This method thus includes the gathering of spectral data from a target sample.

Even more recently, the spectral data of the target sample is used as search criteria for a subsequent search of a database of standard spectral data located in a computer attached to the spectrophotometer. This search allows a close match with the target color to be found and a starting point for reformulation. Starting with the formulation that produces the close match, the formulation is repeatedly reformulated until it becomes an acceptably sufficient color match.

SUMMARY OF THE INVENTION

The present invention provides a system and a method for matching, ordering, and quality control of colorant for a target sample at a remote location. The system has a first computer that is operative to receive and transmit target spectral data at a first location. A second computer in the system is located at a second location remote from the first computer. The second computer is operative to receive the target spectral data from the first computer.

The system further has a database including a plurality of standard data sets, with each standard data set having standard spectral data. The system's search software is capable of searching a database using the target spectral data as search criteria. When the software searches the database using this search criteria, it returns a match with a data set having standard spectral data that matches the target spectral data. The search software can also only transmit spectral data and use the second computer to search via a connection from the first computer.

In the preferred embodiments, the database resides on the second computer. Alternatively, the database can reside on the first computer. In both embodiments, the first computer is remote from the second computer. In addition, the search criteria can be constrained by setting a search tolerance so that the results fall within a predetermined range.

In the preferred embodiments, the system further comprises a device that can sense the target spectral data of the target sample and input that target spectral data into the first computer. The first computer is further operative to receive and transmit target non-spectral data. The second computer is further operative to receive the target non-spectral data from the first computer or by direct input at the second computer. The data sets further comprise standard non-spectral data. The software is further capable of searching the database using both the target non-spectral data and the target spectral data as search criteria, optionally, within a specified search tolerance.

In the preferred embodiments, the database further comprises a plurality of formula identifiers. Each formula identifier corresponds to a data set in a one-to-one relation, that is, for every data set there is a respective, single formula identifier. Both the first and second computers are operative to receive and transmit formula identifiers from and to each other. The software program can additionally provide a price quote for a product made in accordance with the formula that corresponds to the formula identifier that was returned as a match from a search of the above-mentioned database.

The present invention also provides a method of matching color utilizing an internet-based, client-accessible website, direct connection with a private network, direct connection with the second computer, or other similar electronic means (collectively referred to as a "network") capable of matching colors and generating price quotes. The method begins with the step of providing a connection to the network that has a user interface including an input window. The method continues with the step of receiving target spectral data, target non-spectral data, or a combination thereof, to form a target data set at the network. This is followed by the step of comparing the target data set against a database that contains standard data sets. The method may finish with the step of displaying on the network a match between the target data set and the standard data sets.

The method may further include the step of receiving information regarding quantity at the network. Alternatively, the network can include a default quantity value. The software, which is capable of determining a price quote by utilizing quantity information with a formula identifier, is implemented next determining the price quote. The method may end when the price quote is displayed on the network. The method may also continue with either a delivery of a sample or a delivery of a product. The sample or product may be delivered alternatively or in series. Alternatively, the method may continue with the placing of orders, the confirmation of receipts of orders, invoicing, billing, returning, delivering, making, shipping, certifying (e.g., QC specifications, physical or chemical properties, MSDS), replacing and reordering.

The present invention further provides a quality control method. In the preferred embodiments, the first step of the method obtains spectral data from a target sample at a first location. The next step accesses a plurality of standard samples at a second location remote from the first location. A subsequent step identifies a standard sample that has the nearest matching standard spectral data compared with the target sample spectral data. The next step involves receiving the standard sample having the nearest matching spectral data at the first location. This is followed by the step of obtaining spectral data from the standard sample at the first location. The next step compares that spectral data with the target sample spectral data. This is followed by the step of evaluating the comparison between the two so that the degree of similarity between them is determined.

The quality control method may continue with the step of producing a finalized product sample using the same formulation that was previously used to produce the standard sample. This is followed by the step of obtaining the product sample spectral data from the product sample. Next is the step of comparing the product sample spectral data to the standard sample spectral data that was obtained at the first location, and evaluating the comparison between the two. The degree of similarity between them is then determined. In the preferred embodiment, the step of obtaining the product sample spectral data is performed at the first location by the same device used to obtain the spectral data of the target sample.

The present invention also provides a method of color matching. The method starts with the step of obtaining target spectral data from a target sample to provide search criteria, and then the step of inputting the target spectral data into a first computer at a first location. A database is provided comprising a plurality of standard data sets, with each standard data set including standard spectral data and standard non-spectral data. The method uses a specified search tolerance for one or more of the data set constituents to use in a search of the database. The search tolerance defines a range of the standard spectral data that provides an acceptable match. The next step is searching the database to determine an acceptable match using the search criteria. This is followed by the step of determining whether an acceptable match is found. If an acceptable match is found, a formula identifier is forwarded to the second computer at a second location remote from the first location. But, if an acceptable match is not found, the tolerance value can be changed and a new search performed or the target spectral data is forwarded to a second computer at a second location remote from the first location. If so, the method includes custom formulating to achieve a formula that, when utilized, produces an acceptable match with the target sample. Preferably, the method continues by adding the new acceptable match to the database for future use as a data set.

In the preferred embodiments, the database and the search criteria each further comprise standard non-spectral data. That is, the search tolerance allows placing of limits on the standard non-spectral data when it is used as search criteria to search a database that contains standard non-spectral data. New custom matches are added to the database and the data set includes non-spectral data.

In the preferred embodiments, if the search result contains no matches within the search tolerance, the search result returns an option to change the tolerance range and/or transmit spectral data to a remote second computer. If the search result contains a match that is within the specified search tolerance, then the search result returns a formula identifier that corresponds to match or matches that fall within the search tolerances.

DETAIL DESCRIPTION OF THE INVENTION

Figure 1:
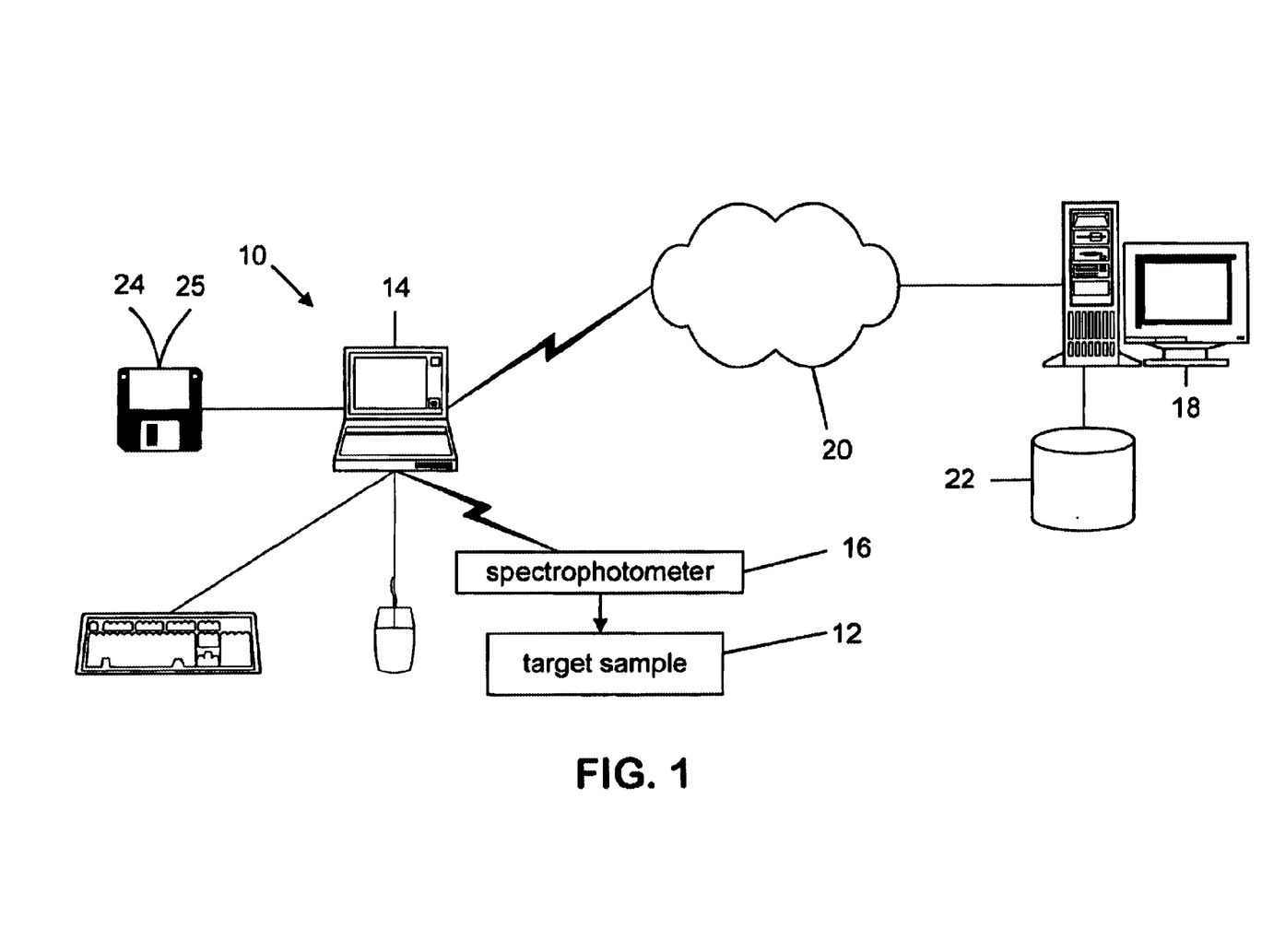
FIG. 1 is a schematic view of a system including a first embodiment of the invention.

A system 10 comprising a preferred embodiment of the present invention is shown schematically in FIG. 1. The system 10 is used to provide a match for the color, and optionally other characteristics, of a target sample 12 of a polymer material.

The system 10 includes a first computer 14 at a first location. Exemplary first locations are customers' facilities, retail outlets, or places where a colorant supplier may make sales visits or otherwise match and order colorant products. Preferably, the first computer 14 is a laptop computer, which is operative to receive and transmit target spectral data. But any other suitable device may be used, such as a desktop, handheld personal computer, server or client computer, personal digital assistant, electronic appliance, minicomputer, mainframe, and the like.

Preferably, the system 10 includes a device 16, which is operatively attached and located with the first computer 14, and which is operative to sense the target spectral data of the target sample 12 and input that target spectral data into the first computer 14. The device 16 can be any instrument capable of sensing a color spectrum. Preferably, the device 16 is a spectrophotometer. Exemplary spectrophotometers are the Microflash® spectrophotometer available from Datacolor International® (Lawrenceville, N.J.) or the MacBethe® 7000 or 2020 available from Gretag-Macbethe® (New Windsor, N.Y.). Preferably, the device 16 is also able to sense other spectral data characteristics of the target sample 12, such as opacity, gloss, pearlescence, surface texture, and the like.

The system 10 also has a second computer 18. The second computer 18 is located remotely from the first computer 14 and is operative to receive the target spectral data sent from the first computer 14. Preferably, the second computer 18 is a server computer. Communication between the first 14 and second computer 18 is provided via a communication medium 20 operative to transmit data. Preferably, the communication medium 20 is the World Wide Web.

As noted above, the second computer 18 is remote from the first computer 14. Preferably, the second computer 18 is located at a place under the supervision and control of the system administrator. Exemplary locations include a colorant supplier headquarters or a colorant supplier laboratory.

Figure 2:
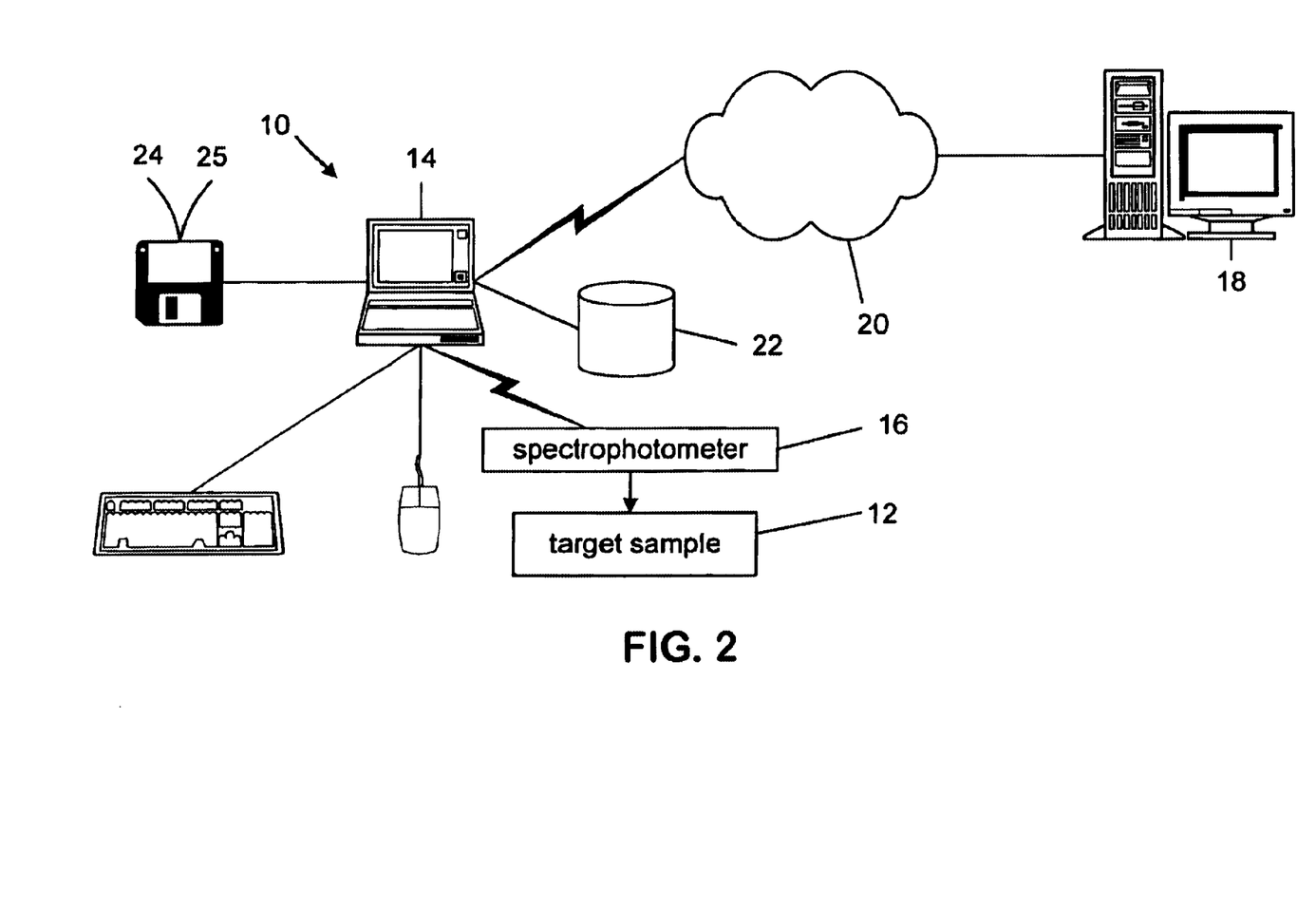
FIG. 2 is a schematic view of a system including a second embodiment of the invention.

The system further includes a database 22. In a first embodiment, the database 22 resides on the second computer 18 as shown in FIG. 1. In the second embodiment, as shown in FIG. 2, the database 22 resides on the first computer 14. In each case, the database 22 includes a plurality of data sets, each data set having at least standard spectral data, standard non-spectral data, and a formula identifier that corresponds to that data set. The formula identifier also corresponds to a formula allowing the data set to be matched to a formula. The formula is a combination of polymers, pigments, dyes, additives, carriers, and/or other components used in making a particular colorant product.

Preferably, the database backend is Paradox® from Borland/Inprise Inc. (Scotts Valley, Calif.). Other database products can also be used, such as Access® from Microsoft (Redmond, Wash.) and the like. With the database 22 in a single location and accessible from other locations it is possible to monitor, maintain, upgrade, update, and provide security for the database 22. In the preferred embodiments, the database 22 is encrypted. Exemplary encryption technology is named Blowfish®, and is commercially available from Invincible Data Systems, Inc. (Sunnyvale, Calif.).

The software 24 of the system 10 is preferably resident on a disk and is loaded onto the first computer 14. Optionally, the software can reside on a CD-ROM, DVD, an administrator controlled computer, another computer connected to the network, and the like. Preferably, the software 24 of the system 10 is capable of searching the database 22 using the target spectral data as search criteria. Alternatively, the software 24 of system 10 communicates with the second computer 18 where software resides, having search capability directed through the first computer 14. In the preferred embodiments, the software 24 is capable of searching within specified, adjustable search tolerances. When the software 24 searches the database 22 using the search criteria, it returns one or more matches with data sets having a match with the search criteria within a specified tolerance, if any tolerance is specified. The search tolerance can be specified, for example, within a certain percent deviation from the spectral curve, or within a certain number of nanometers, or any combination or degree of deviation from one or more data-points within a data set. The software 24 displays all data sets within the specified tolerance and, optionally, the corresponding formula identifier.

Further, in the embodiment in which the database 22 is located on the first computer 14, the software 24 may search, find, and select a formula identifier corresponding to an acceptable match in view of the search tolerance. If an acceptable match is found the software 24 transmits the formula identifier to the second computer 18. On the other hand, if no acceptable match is found, then the software 24 transmits the target spectral data and target non-spectral data to the second computer 18. The target spectral and non-spectral data can then be used, for example, by the colorant supplier as search criteria to search the database 22 for a near match to use as a starting point for reformulation. Reformulation includes changing an existing formula or developing a new formula by changing parameters such as pigment or dye levels, pigment/dyes used, resin amounts, and the like, to yield a new formula. The changed or new formula will have a unique formula identifier, spectral characteristics, and non-spectral characteristics. In addition, the target spectral and non-spectral data can be used as a reference to determine whether reformulating has produced a sufficient match. To this end, having a near color match at the beginning of the reformulation effort can save time.

In both of the preferred embodiments, the first computer 14 of the system 10 is further operative to transmit and receive non-spectral data. Non-spectral data includes: resin type; Food and Drug Administration (FDA) status; Underwriter's Laboratory (UL) rating; ultra-violet (UV) light stability or compatibility; miscellaneous special conditions; visual effects (e.g., holographic-flake, granite, marble, or pearlescence); physical characteristics; chemical resistance characteristics; melt, softening or other temperatures; price; Pantone® reference identifier; manufacturing or delivery requirements, such as delivery date or method, manufacturing site, machinery type, specific machinery identification; manufacture date and/or time; and the like. The second computer 18 is further operative to receive the non-spectral data from the first computer 14, or to have non-spectral data input directly for use with the spectral data received from the first computer 14. The data sets of database 22 further contain standard non-spectral data. The software 24 is further capable of searching the database 22 using both the target spectral data and the target non-spectral data as search criteria. The software 24 then returns a match with a data set having standard non-spectral data that matches the target non-spectral data and the standard spectral data that matches the target spectral data within the specified tolerance.

The system 10 in the preferred embodiments also employs software 25 resident on a disk and loaded onto the first computer 14 and capable of working interactively with the database or integrating with the searching software 24. This software program 25 can provide price quotes for products made in accordance with the formulae that correspond to the formula identifiers returned as matches from searching the database 22. Alternatively, price quotes can be part of the data set for a particular formula and stored in the database 22 or in another database.

Figure 3:
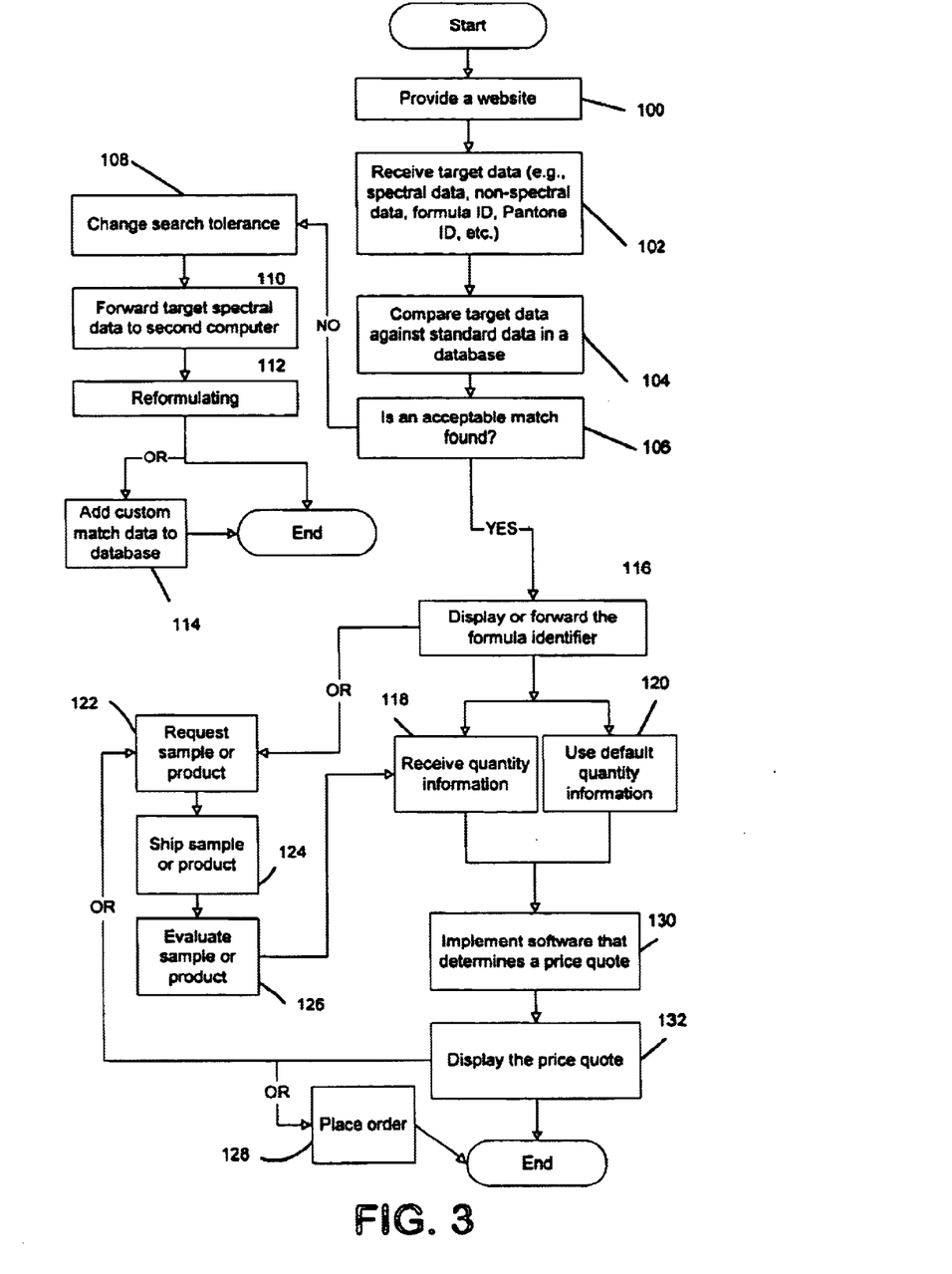
FIG. 3 is a flow chart of the method for the internet network-based method of color matching of the present invention.

The present invention also provides a method of using the system 10 to match color using an internet-based, client-accessible network as shown in the flow chart of FIG. 3. The method entails the step 100 of providing a network that has a user interface that includes an input window on the first computer 14. The network is available via the World Wide Web through the Internet, a virtual private network, a direct dial-up or wireless link, and the like. Preferably, the network is available via a virtual private network.

The next step 102 entails receiving at the network, via the user interface, target spectral data, target non-spectral data, or a combination thereof, forming a target data set. Examples of non-spectral data are listed above. The target data set becomes the search criteria by which a near color match may be found. In the preferred embodiments, the search criteria can be constrained by a specified, adjustable search tolerance. The search tolerance is a range of values that define the allowed amount of variation, above or below, from the search criteria or from exact conformity to the specified search criteria values. As a first example, the search tolerance may be five percent, so that the match with the target spectral data can be either exactly the same as the target spectral data, or plus or minus five percent of the value of the target spectral data or of any deviation from any one portion of the target spectral data. A second example is the search tolerance is a statistical variation of one percent from the spectral curve representing the target spectral data or of any deviation from any one portion of the target spectral data. A third example is search criteria of the previous two examples in combination with one or more of non-spectral data points within the data set.

The next step 104 compares the target data set against standard data sets contained in the database 22. Each standard data set includes standard spectral data, standard non-spectral data, and a corresponding formula identifier. The formula identifier allows the standard data set to be linked to a formula. The formula, when utilized, produces a product that has the characteristics of the spectral and non-spectral data found in the standard data set. The comparison enables a determination of a match between the standard data sets and the target data set. If the search tolerance is specified and is too broad or narrow, a number of matches too large to be useful, or no matches, may be found between the standard data sets and the target data set. The search can be rerun with a search tolerance more broad or narrow than the previous search to achieve a useful number of matches. When the search tolerance is set so broadly that the search results return only unacceptable matches, the option can be taken to forward the target data set to the second location for formulation work intended to result in a new product with sufficiently matching standard spectral and non-spectral data. The next step 106 determines whether a match is acceptable in view of the search tolerance. If the answer is yes, the software 24 displays 116 on the network the matching standard data set(s) and, optionally, their corresponding formula identifier(s) or forwards the formula identifier to a second computer.

The method can further involve the step 118 of receiving at the network information regarding quantity. Alternatively, the network can include a default quantity value 120, of one thousand pounds, for example. With a default quantity, it is possible for the network user to determine unit prices, and thereby to estimate pricing for an order of a different quantity. Preferably, the software 25, which is capable of determining a price quote by utilizing quantity information and a corresponding formula identifier, is implemented in the next step 130. The software 25 then determines the price quote by utilizing the quantity information (whether a default value or input value) and the corresponding formula identifier. In step 132, the price quote is then displayed on the network. The method can end here, or alternatively, the method can continue with the further steps of ordering 122 product, and making and shipping 124 a product, and evaluating 126 the product.

Alternatively, the method can have the step 122 of requesting a sample directly based on the formula identifier identified in step 116. The next step 124 is shipping the standard sample, from a colorant supplier for example, to the first location, which can be the customer's facility. This is followed by the step 126 of evaluating the standard sample to determine its acceptability. If the standard sample is acceptable, a price determination can be made based on the quantity 118 of the order. This sub-process can be repeated. Optionally, the system 10 is connected to a third computer by standard means. The third computer is operative to receive a formula identifier or other manufacturing data implement the manufacture of the product corresponding to the formula identifier. Alternatively, the third computer can implement shipping, the confirmation of receipts of orders, invoicing, billing, certifying, replacing, reordering, or other like activity.

Alternatively, if an acceptable match is not found 106, the step 108 of changing the search tolerance can be taken. Also, the target spectral and/or non-spectral data can be forwarded 110 to the second computer. When the spectral and/or non-spectral data are forwarded to the second computer the reformulation process 112 creates a custom match. The spectral and/or non-spectral data can optionally be added 114 to the database.

Figure 4:
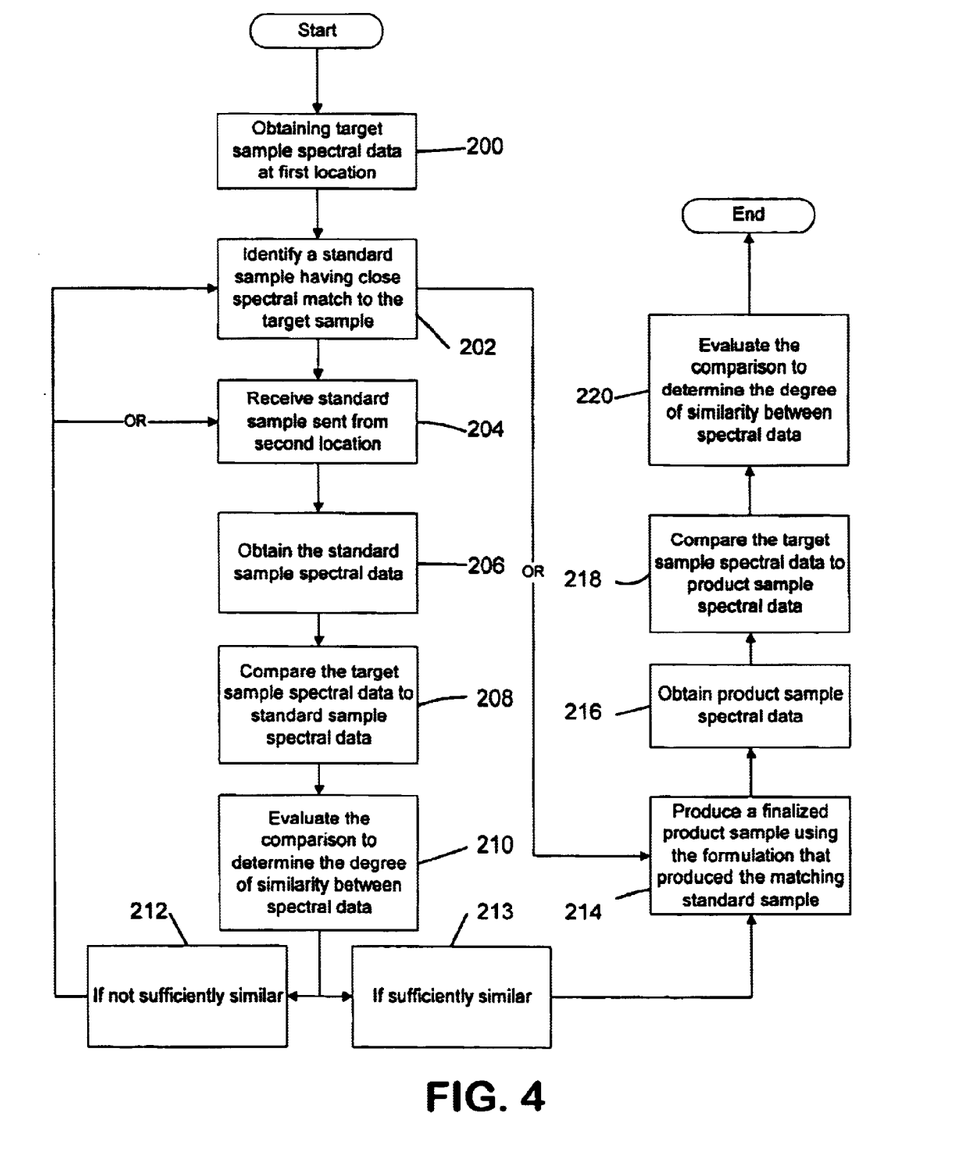
FIG. 4 is a flow chart of the quality control method of the present invention.

As shown schematically in FIG. 4, the present invention also provides a quality control method. The first step 200 obtains spectral data from the target sample 12. This allows the determination of the target sample spectral data at a first location as described above. The next step 202 identifies a standard sample having the nearest matching standard spectral data to the target sample spectral data. The standard sample, produced at a second location, is sent to the first location for evaluation, many times in less than 48 hours from the request. Optionally, a product may be produced 214 using the formulation that produced the standard sample and the method can finish normally. Preferably, however, the next step 204 receives the standard sample back at the first location, and is followed by the step 206 of obtaining standard sample spectral data from the standard sample at the first location. Preferably, steps 200 and 206 are performed by the same device. The next step 208 compares the target sample spectral data to the standard sample spectral data obtained at the first location. This is followed by an evaluation step 210 whereby the degree of similarity between them is determined. If the first proposed standard sample is not sufficiently similar 212, the process is repeated from the point where a close match is identified 202 until a sufficiently similar match is found. Optionally, if the first proposed sample is not sufficiently similar 212, the process can be repeated starting at step 202. The selected search tolerance level will affect the degree to which a successful match is found. There is also the possibility that the standard sample is of poor quality, in which case the response is to send a new standard sample of the correct quality level and repeat the process starting at receiving 204 a standard sample sent from a second location.

If a sufficiently close sample is found 213 the quality control method continues, with the step 214 of producing a final product using the same formulation previously used to produce the standard sample. Exemplary formulations may be a formula for a compound used "as is" by a polymer processor, or a concentrate, or a masterbatch that is intended to be let-down (i.e., added) to another quantity of resin. The spectral data is obtained in the next step 216 from the product sample. In addition, the following step 218 compares the product sample spectral data to the standard sample spectral data that was obtained at the first location. Alternatively, for step 218, a visual comparison of the product sample and the target standard can be used, however this is a more subjective method. The comparison between the two is evaluated in a subsequent step 220 so that between them the degree of similarity and sufficiency of the color match is determined. If after several iterations of not sufficiently similar 212, no desirable match is found, then the process can continue with the reformulation steps discussed above.

It is possible, using the system 10 of the present invention, to significantly reduce the time necessary to get a product to market. The delays caused by transporting proposed samples back and forth between a customer and a supplier are reduced or eliminated when the data representing the color and other characteristics are transmitted rather than a physical sample of the target itself. The timesaving results in a direct reduction in the time-to-market for a product. Because the number of samples sent back and forth, prior to the selection of a sufficient color match, is reduced or eliminated, there is an associated cost savings realized from a reduction in shipping expenses when utilizing the present invention. In addition to avoiding delays caused by shipping the target sample 12, time savings are realized in developing the formulation for the product sample, producing a sample intended to match the target sample, and evaluating the target sample versus the product sample because objective rather than subjective criteria are used.

In an alternative embodiment, the use of calibrated video and monitors allows for comparisons that are more accurate and eliminate the need for physical samples to be exchanged or even measured at all. Specifically, the target spectral data is created on the calibrated monitor. Thus, the need for spectral data to be obtained by scanning with a spectrophotometer or similar device is eliminated. Specifically, the need is eliminated for target sample 12 and any physical standards or previously produced samples that were required for visual inspection or scanning purposes. This results in further savings in time and shipping expense. Two exemplary systems are preferred for the calibration of monitors: Prove It® commercially available from Imaging Technologies Corporation® (San Diego, Calif.), which includes a colorimeter, and calibration and profiling software; and PhotoCal® commercially available from ColorVision® (Northvale, N.J.), which includes software and a colorimeter package.

Although a preferred embodiment of the invention has been shown and described, it should be understood that various modifications and substitutions, as well as rearrangements and combinations, can be made by those skilled in the art, without departing from the spirit and scope of this invention.

What is claimed is:

1. A system for matching a target sample having spectral characteristics, the system comprising:
   (a) a first computer at a first location operative to receive and to transmit target spectral data;
   (b) a second computer at a second location remote from said first location, said second computer being operative to receive said target spectral data from said first computer;
   (c) a database including a plurality of data sets, each data set comprising standard spectral data; and
   (d) software residing on said first computer and capable of searching said database using said target spectral data as search criteria and returning a match with a data set having standard spectral data that matches said target spectral data;
   wherein:
     said first computer is further operative to receive and transmit target non-spectral data;
     said second computer is further operative to receive said target nonspectral data from said first computer;
     each of said data sets further comprises standard non-spectral data;
     said software is further capable of searching said database using both said target spectral data and said target non-spectral data as search criteria and returning a match with a data set having standard non-spectral data that matches said target non-spectral data; and
     wherein said target non-spectral data comprises visual effects comprising holographic-flake, granite, marble, or pearlescence.

2. A system as defined in claim 1 wherein said database resides on said second computer.

3. A system as defined in claim 1 wherein said database resides on said first computer.

4. A system as defined in claim 1 further comprising a device operative to sense said target spectral data from a target sample and to input said target spectral data into said first computer.

5. A system as defined in claim 4 wherein said device is a spectrophotometer.

6. A system as defined in claim 1 wherein: said target non spectral data further comprises resin type; governmental regulation status; independent testing laboratory status; ultra-violet light stability or compatibility; physical characteristics; chemical resistance characteristics; melt or softening temperatures; industry standard reference identifier; manufacturing requirements; delivery requirements; manufacturing site; machinery type; specific machinery identification; manufacture date; or manufacture time; or combinations thereof.

7. A system as defined in claim 1 wherein: said database further comprises a plurality of formula identifiers corresponding to said plurality of data sets; and said software is further capable of identifying a formula identifier corresponding to each of said matched data sets.

8. A system as defined in claim 7 wherein said software is further capable of providing a price quote for a product made in accordance with a formula corresponding to a formula identifier.

9. A system for matching a target sample having spectral characteristics, the system comprising:
   (e) a first computer at a first location operative to receive and to transmit target spectral data;
   (f) a second computer at a second location remote from said first location, said second computer being operative to receive said target spectral data from said first computer;
   (g) a database on said second computer including a plurality of data sets, each data set comprising standard spectral data; and
   (h) software capable of searching said database using said target spectral data as search criteria and returning a match with a data set having standard spectral data that best matches said target spectral data;
   wherein:
     said first computer is further operative to receive and transmit target non-spectral data;
     said second computer is further operative to receive said target nonspectral data from said first computer;
     each of said data sets further comprises standard non-spectral data;
     said software is further capable of searching said database using both said target spectral data and said target non-spectral data as search criteria and returning a match with a data set having standard non-spectral data that matches said target non-spectral data; and
     wherein said target non-spectral data comprises visual effects comprising holographic-flake, granite, marble, or pearlescence.

10. A system as defined in claim 9 further comprising a device operative to sense said target spectral data from a target sample of polymer material and to input said target spectral data into said first computer.

11. A system as defined in claim 9 wherein said device is a spectrophotometer.

12. A system as defined in claim 9 wherein: said target non spectral data comprises resin type; governmental regulation status; independent testing laboratory status; ultra-violet light stability or compatibility; physical characteristics; chemical resistance characteristics; melt or softening temperatures; industry standard reference identifier; manufacturing requirements; delivery requirements; manufacturing site; machinery type; specific machinery identification; manufacture date; or manufacture time; or combinations thereof.

13. A system as defined in claim 9 wherein: said database further comprises a plurality of formula identifiers corresponding to said plurality of data sets; and said software is further capable of identifying a formula identifier corresponding to each of said matched data sets.

14. A system as defined in claim 13 further comprising: additional software capable of providing price quotes for products made in accordance with formulae corresponding to said formula identifiers.

15. A method of color matching, said method comprising:
   (a) providing a network having a user interface;
   (b) receiving through said user interface target spectral data and target non spectral data, thereby forming a target data set;

(c) providing a database comprising a plurality of standard data sets, each standard data set including standard spectral data and standard non-spectral data;

(d) comparing said target data set to said database to determine a match between said target data set and said standard data sets; and (e) displaying said match on the network; and wherein said target non-spectral data comprises visual effects comprising holographic-flake, granite, marble, or pearlescence.

16. A method as defined in claim 15 wherein said database further comprises a plurality of formula identifiers, each of which corresponds to a standard data set and a formula, thereby associating each formula with a standard data set; and each formula comprises specifications for producing a product having the spectral data and non-spectral data of the associated standard data set.

17. A method as defined in claim 16 further comprising:

(f) receiving through said user interface quantity information;

(g) implementing software capable of determining a price quote by utilizing said quantity information and said corresponding formula identifier;

(h) determining said price quote by utilizing said quantity information and said corresponding formula identifier; and (i) displaying on the network said price quote.

18. A quality control method comprising:

(a) obtaining spectral data and non-spectral data from a target sample to determine target sample spectral data at a first location;

(b) accessing a plurality of standard samples produced at a second location;

(c) identifying a standard sample having the nearest matching standard spectral data to said target sample spectral data;

(d) receiving said standard sample at said first location;

(e) obtaining standard sample spectral data and non-spectral data from said standard sample at said first location;

(f) comparing said target sample spectral data and non-spectral data to said standard sample spectral data and non-spectral data obtained at said first location; and (g) evaluating the comparison of said standard sample spectral data and non-spectral data obtained at said first location to said target sample spectral data and non-spectral data, whereby the degree of similarity to said standard sample is determined; and wherein said target non-spectral data comprises visual effects comprising holographic-flake, granite, marble, or pearlescence.

19. A method as defined in claim 18 further comprising:

(h) producing a finalized product sample using a formulation previously used to produce said standard sample;

(i) obtaining product sample spectral data from said product sample; comparing said product sample spectral data to said standard sample spectral data obtained at said first location; and (k) evaluating the comparison of said standard sample spectral data to said product sample spectral data, whereby the degree of similarity to said standard sample is determined.

20. A method of color matching, said method comprising:

(a) providing search criteria including target spectral data and non-spectral data obtained from a target sample;

(b) inputting said target spectral data and non-spectral data into a first computer at a first location;

(c) providing a database comprising a plurality of standard data sets, each standard data set including standard spectral data and standard non-spectral data;

(d) specifying a search tolerance to use in searching said database, said search tolerance defining a range of said standard spectral data that provides an acceptable match;

(e) searching said database to determine a match using said search criteria;

(f) determining if said match is acceptable in view of said search tolerance;

(g) forwarding a formula identifier to a second computer at a second location remote from said first location if said match is acceptable; and (h) forwarding said target spectral data and non-spectral data to a second computer at a second location remote from said first location if said match is not acceptable; and reformulating at said second location to achieve a formula that when utilized produces an acceptable match; and wherein said target non-spectral data comprises visual effects comprising holographic-flake, granite, marble, or pearlescence.

* * * * *